Patented Dec. 28, 1926.

1,612,674

UNITED STATES PATENT OFFICE.

FERNANDO SOMOZA VIVAS, OF LOS ANGELES, CALIFORNIA.

FIREPROOF THINNER FOR PAINTS AND VARNISHES.

No Drawing. Application filed June 14, 1923, Serial No. 645,346. Renewed May 26, 1926.

The invention relates to a thinner for use in the mixing of paints, and has as an obje t the provision of a material to replace the usual turpentine and "Nearturps" used in the mixture of paint, which substitute is non-inflammable. A further object of the invention is the provision of such a thinner which will render paint in which it is substituted for the usual turpentine, fire-resistant.

The formula which it is preferred to use as an embodiment of the invention is as follows:

|   | Parts. |
|---|---|
| "Nearturps" | 40 |
| Turpentine | 10 |
| Zinc sulphate | 5 |
| Hexachlorethane | 1 |
| Drying oil | 4 |
| Carbon tetrachloride | 40 |

The oil listed in the above formula is preferably linseed oil, but tung oil or other known paint oils may be used.

The material prepared by the above formula may be used to replace the ordinary "Nearturps", or turpentine, or mixture thereof, as utilized in the mixture of paint, to render the same fire-resistant, and when mixed with the proper ingredients in the manner set forth in my co-pending application Serial Number 645,344 filed June 14, 1923 will produce an absolutely fireproof varnish or, when combined with other ingredients, as described in another co-pending application, Serial Number 645,341 filed June 14, 1923, will produce an absolutely fireproof paint.

The "Nearturps" recited in the above formula is a gasoline produced by straight distillation, as distinguished from a cracking process, and which has been deodorized by treatment with alcohol. Other turpentine substitutes may be utilized in lieu thereof if desired.

Minor changes may be made in the proportion of parts, or known equivalents may be substituted for some of the ingredients above specified, without departing from the spirit of the invention.

I claim:

1. A thinner comprising turpentine, zinc sulphate, hexachlorethane, drying oil, and carbon tetrachloride, in proportions to produce a non-inflammable solvent or thinner for paints.

2. A thinner comprising "Nearturps", turpentine, zinc sulphate, hexachlorethane, drying oil, and carbon tetrachloride, in proportions to produce a non-inflammable solvent or thinner for paints.

3. A thinner comprising turpentine 10 parts, zinc sulphate 5 parts, hexachlorethane 1 part, drying oil 4 parts, carbon tetrachloride 40 parts, and "Nearturps" 40 parts.

FERNANDO SOMOZA VIVAS.